C. D. COOK AND S. S. BLAISDELL.
CLEAT.
APPLICATION FILED FEB. 18, 1919.

1,328,985.

Patented Jan. 27, 1920.

Inventors
Charles D. Cook
Sidney S. Blaisdell

By Howard E. Barlow
Attorney

UNITED STATES PATENT OFFICE.

CHARLES D. COOK, OF CRANSTON, AND SIDNEY S. BLAISDELL, OF PROVIDENCE, RHODE ISLAND.

CLEAT.

1,328,985. Specification of Letters Patent. Patented Jan. 27, 1920.

Application filed February 18, 1919. Serial No. 277,811.

*To all whom it may concern:*

Be it known that we, CHARLES D. COOK and SIDNEY S. BLAISDELL, citizens of the United States, and residents of Cranston and Providence, respectively, in the county of Providence and State of Rhode Island, have invented certain new and useful Improvements in Cleats, of which the following is a specification.

This invention relates to a cleat of the type more particularly adapted for providing convenient means to which a rope may be fastened, and the invention has for its object to mount such a cleat on a clamping member whereby it may be readily and releasably secured in any desired position.

A further object of this invention is to provide means in the cleat whereby it may be rotated and locked in any desired position relative to the clamp.

With these and other objects in view, the invention consists of certain novel features of construction, as will be more fully described, and particularly pointed out in the appended claims.

Figure 1:
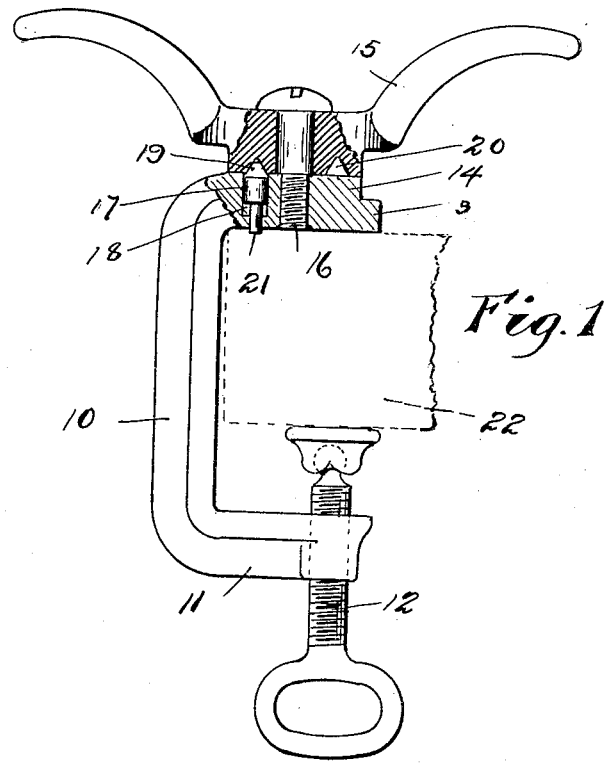

In the accompanying drawings:

Figure 1— is a side elevation partly in section showing our improved clamp cleat.

Figure 2:
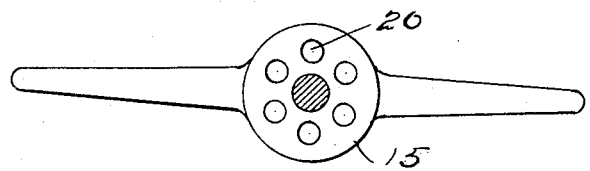

Fig. 2— is a face view of the under side of the cleat, showing the locking pin receiving holes therein.

Referring to the drawings, 10 designates the clamp frame, in one arm 11 of which is mounted the usual clamp screw 12. On the opposite arm 13 we have provided an enlarged circular boss 14 on the face of which is mounted a cleat 15, the same being secured to the arm 13 by means of the screw or bolt 16 whereby this cleat may be rotated on this arm and adjusted to any desired position.

In order to secure or lock this cleat after having been adjusted, we have provided a locking pin 17 mounted to be moved endwise in the recess in the arm 13, the inner end 19 of this pin being tapered or reduced to fit into any one of a number of corresponding holes 20 formed in the bottom of the cleat body. The outer end of this locking pin is reduced as at 21 and extends through the inner face of arm 13 whereby when this clamp is positioned on a supporting member, as illustrated in dotted lines at 22, the reduced portion 21 of this pin is engaged by the support and its end 19 is forced into the opposite opening 20 in the cleat thereby automatically and securely locking this cleat in adjusted position.

This arrangement is found of particular advantage as in some cases it is desired that the arms of the cleat shall stand parallel with the arms of the clamp while in other cases it might be particularly desired that it should stand at some other angle thereto. Therefore with our particular design of cleat it may be rotated to and locked into any desired position relative to the arms of the clamp.

We have shown and described a cleat which is adapted to be rotated on the clamping member, but it is our desire not to be limited to this particular adjustable arrangement of the cleat upon the clamp, as the cleat may be fixed permanently in one position on the clamp if desired without departing from the spirit of this invention, the scope of which is limited only by the terms of the appended claims.

We claim:

1. A new article of manufacture comprising a clamping member, and a cleat rotatably mounted on said clamp whereby the cleat may be set in different angles on the clamp.

2. A new article of manufacture comprising a clamp, a cleat pivotally mounted to rotate and be set at different angles on said clamp, and means for locking the cleat in adjusted position on said clamp.

3. A new article of manufacture comprising a clamp, a cleat adjustably mounted on said clamp, and means for automatically locking the cleat in adjusted position by positioning the clamp on its support.

4. A new article of manufacture comprising a clamp, a cleat adjustably mounted on said clamp and provided with a recess, and a lock pin mounted to be operated by the positioning of said clamp to engage the recess in said cleat and lock the cleat against relative movement.

In testimony whereof we affix our signatures.

CHARLES D. COOK.
SIDNEY S. BLAISDELL.